(12) United States Patent
van Dest et al.

(10) Patent No.: US 6,413,008 B1
(45) Date of Patent: Jul. 2, 2002

(54) ASSEMBLY SYSTEM ON A PROPELLER SHAFT

(75) Inventors: Jean-Claude van Dest, Bois le Roi (FR); Werner Krude, Neunkirchen (DE)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/555,318

(22) PCT Filed: Oct. 30, 1998

(86) PCT No.: PCT/EP98/06885

§ 371 (c)(1),
(2), (4) Date: Sep. 5, 2000

(87) PCT Pub. No.: WO99/27267

PCT Pub. Date: Jun. 3, 1999

(30) Foreign Application Priority Data

Nov. 22, 1997 (DE) .......................................... 197 51 855

(51) Int. Cl.[7] ........................... B60B 27/04; B60B 27/06
(52) U.S. Cl. .................... 403/359.1; 403/364; 384/544; 384/538
(58) Field of Search .............................. 403/359.1, 364; 384/538, 544; 180/258

(56) References Cited

U.S. PATENT DOCUMENTS

| | | | | |
|---|---|---|---|---|
| 1,882,616 A | * | 10/1932 | Hutchingson | 403/238 |
| 2,439,161 A | * | 4/1948 | Du Bois | 248/672 |
| 2,553,220 A | * | 5/1951 | Troeger | 403/364 X |
| 2,710,763 A | * | 6/1955 | Gilbert | 403/364 |
| 2,807,213 A | * | 9/1957 | Rosen | 403/364 X |
| 3,191,453 A | * | 6/1965 | Hoven | 403/364 X |
| 4,047,770 A | * | 9/1977 | Korenhof et al. | 384/482 |
| 4,465,326 A | * | 8/1984 | Guimbretiere | 384/544 |
| 4,687,084 A | * | 8/1987 | Leigh-Monstevens et al. | 403/364 X |
| 5,021,001 A | * | 6/1991 | Ramirez | 439/349 |
| 5,853,250 A | * | 12/1998 | Krude et al. | 384/544 |

FOREIGN PATENT DOCUMENTS

| | | | | |
|---|---|---|---|---|
| DE | 3906139 A | * | 9/1989 |
| GB | 944649 A | * | 12/1963 |
| GB | 2097734 A | * | 11/1982 |
| SE | 343720 A | * | 2/1960 |

\* cited by examiner

Primary Examiner—Lynne H. Browne
Assistant Examiner—Ernesto Garcia (57) ABSTRACT

A connecting assembly at a driveshaft between the driveshaft and a wheel hub, having end toothing of an outer joint part of a constant velocity joint of the driveshaft, which outer joint part is at the wheel hub end, and having end toothing of the wheel hub, wherein the end toothings are axially inserted into one another and circumferentially engage one another in a play-free way and wherein the teeth of the end toothings each comprise radially outwardly opening circumferential grooves which are delimited by two flanks and which, jointly, form a circumferentially extending annular groove in which, on the outside, there is arranged a securing ring; as well as a connecting assembly at a driveshaft between the driveshaft and a shaft flange, having end toothing of an outer joint part of a constant velocity joint of the driveshaft, which outer joint part is at the shaft flange end, and having end toothing of the shaft flange, wherein the end toothings are axially inserted into one another and circumferentially engage one another in a play-free way and wherein the teeth of the end toothings each comprise radially outwardly opening circumferential grooves which are delimited by two flanks and which, jointly, form a circumferentially extending annular groove in which, on the outside, there is arranged a securing ring.

25 Claims, 9 Drawing Sheets

ASSEMBLY SYSTEM ON A PROPELLER SHAFT

DESCRIPTION

The invention relates to connecting assemblies at a driveshaft, i.e. between an outer joint part of a constant velocity joint of the driveshaft and a wheel hub, or between an outer joint part of a constant velocity joint of the driveshaft and a shaft flange, e.g. of a shaft journal of a differential drive, for the purpose of being used in the driveline of a motor vehicle.

U.S. Pat. No. 967,395 proposes a claw coupling between two rotating hollow shafts. The individual claws comprise internal grooves which, in the engaged condition, form a circumferential continuous groove which, on the inside, is engaged by a retaining ring. This type of coupling is not suitable for connecting annular parts with intermediate walls or inserts because it is necessary to provide access for fitting the retaining ring through the inside of the hollow shafts.

From DE 8136172 U1 there is known a coupling for rigidly connecting coaxial components in the case of driveshafts. The parts to be connected are each provided with end toothings which are inserted into one another. For axial securing purposes, the components to be connected are provided, behind the end toothing, with a shaft step with spring-back. In the inserted condition of the end toothings, circumferentially distributed U-profile pieces in the form of circular segments are inserted into said shaft steps. To prevent the U-profile pieces from becoming unfastened, they have to be joined to form a ring or they have to be secured by a ring slid over same or they have to be tensioned relative to one another by wedges. This leads to very complicated assembly procedures.

DE 196 45 880 A1 describes a connecting assembly between an outer joint part of a constant velocity joint and the shaft flange of a gearbox shaft wherein the two parts, for the purpose of transmitting torque, engage one another in a play-free way in the direction of rotation via inter-engaging claw toothings. At the outer joint part, the front ends of the claws form a composite planar end face which is supported on a composite planar end face at the shaft flange between the base regions of the claws. At each of the ends of the claws of the two parts, there are provided outwardly pointing catches which, at each of the parts, form a composite annular collar with a backwardly pointing conical inclined face. For axially tensioning in a play-free way the planar end faces of the two parts, which planar end faces contact one another, there is inserted a securing ring between the annular collars composed of said catches, which securing ring is positioned on the conical inclined faces. In addition to the inclined faces and the flank faces of the teeth of the claw toothings, the planar end faces have to be machined very accurately in order to form a play-free torque-transmitting connection.

It is the object of the invention to provide connecting assemblies between an outer joint part of a constant velocity joint of a driveshaft and a wheel hub, and between an outer joint part of a constant velocity joint of a driveshaft and a shaft flange, e.g. of a shaft journal of a differential drive, which connecting assemblies are lightweight and strong, easy to produce and quick to mount.

The objective is achieved in that the end toothing of an outer joint part of a constant velocity joint of the driveshaft, which outer joint part is at the wheel hub end, and the end toothing of a wheel hub are axially inserted into one another and circumferentially engage one another in a play-free way and that the teeth of the end toothings each comprise radially outwardly opening circumferential grooves which are delimited by two flanks and which, jointly, form a circumferentially extending annular groove in which, on the outside, there is arranged a securing ring; and in that the end toothing of an outer joint part of a constant velocity joint of the driveshaft, which outer joint part is at the shaft flange end, and the end toothing of a shaft flange are axially inserted into one another and circumferentially engage one another in a play-free way and that the teeth of the end toothings each comprise radially outwardly opening circumferential grooves which are delimited by two flanks and which, jointly, form a circumferentially extending annular groove in which, on the outside, there is arranged a securing ring.

The inventive connecting assemblies are advantageous in that they can be quickly and easily mounted. Because of the very short displacement distances when inserting the end toothings into one another, driveshafts can very easily be mounted between, and removed from between, the wheel hub and the shaft flange of a differential drive, especially in respect of the complete vehicle with a finish-assembled and finish-mounted wheel suspension system. This is advantageous for both the initial assembly and also for subsequent repair work. The connecting assembly is also characterised in that it requires only a small number of parts and features a low weight. The end toothings can be produced largely by a non-chip producing forming operation, with only the circumferential grooves having to be recessed into the teeth by a chip-forming operation, either on each part on its own or, in the case of inter-engaging end toothings, on both parts simultaneously.

Any torque which has to be transmitted by the driveshaft is accommodated by the inter-engaging end toothings of the connecting assembly. Any rotating bending moments at the connecting assembly which are generated by the constant velocity joint rotating in an articulated condition primarily act on the securing ring arranged in the annular groove, with one flank in each circumferential groove being loaded by the securing ring and with the other flank being unloaded; in the case of circumferential grooves which directly circumferentially adjoin one another and which are each associated with another tooth and thus with another one of the two sets of end toothing, the securing ring loads the respective flanks pointing in opposite directions.

According to a first advantageous embodiment it is proposed that, when viewed in cylindrical sections, the teeth of the two end toothings comprise flanks which extend parallel relative to the longitudinal axis of the parts, i.e. feature a simple geometry and, in consequence, are easy to produce.

Because of the axial displaceability of such end toothings, the securing ring and the circumferential grooves have to be designed in such a way that the former is supported by both flanks on the latter in a play-free way to be able to accommodate axial forces in both directions without there occurring any axial offset when the direction of load application changes.

According to a further advantageous embodiment it is proposed that, when viewed in cylindrical sections, the teeth of the two sets of end toothing comprise flanks which enclose an angle with the longitudinal axis of the parts, with the angles between the flanks of the teeth of the two sets of end toothing opening in opposite directions and being of identical size. The teeth of the two sets of end toothing are thus wedge-shaped and can be inserted into one another in a play-free way. The wide tooth bases ensure an increase in strength and uniform loads in the teeth.

With such end toothings with teeth which enclose an angle, axial support of the parts in one direction (pressure) is ensured so that the securing ring and the circumferential grooves can be designed in such a way that play-free contact between the securing ring and the flanks of the groove occurs in the opposite direction (tension) only. The circumferential grooves of the one set of end toothing can be displaced relative to the circumferential grooves of the other set of end toothing in such a way that there is formed a to-and fro-jumping annular groove. In consequence, the flanks of the securing ring contact only those flanks of the circumferential grooves which face the respective other set of end toothing.

A further advantageous embodiment comprises circumferential grooves of the two sets of end toothing which are provided with flanks extending parallel relative to one another, with the securing ring comprising corresponding flanks extending parallel relative to one another. Such circumferential grooves are easy to produce, and it is possible to use standard securing rings.

According to a further embodiment it is proposed that the flanks of the circumferential grooves of the two sets of end toothing enclose an angle relative to an imaginary axis-normal radial plane, which angle opens radially out-wardly, and that the securing ring is provided with corresponding flanks which enclose an identical angle relative to an imaginary axis-normal radial plane. In the inserted condition of the end toothings, the circumferential grooves thus form an annular groove which receives a securing ring with a wedge-shaped profile. Because the securing ring comprises a radial tensioning force, it is pressed into the annular groove, with axial force components occurring due to the wedge-shape of the securing ring.

In cooperation with wedge-shaped end toothings, the wedge-shape of the securing ring and of the circumferential grooves, which form a to-and-fro-jumping annular groove, can generate axial force components which, in the final analysis, press the two sets of end toothing further into one another. In this way, it is possible to avoid an axial play and a circumferential play in the connecting assembly.

Preferred embodiments will be described below with reference to the drawings wherein.

Figure 1:
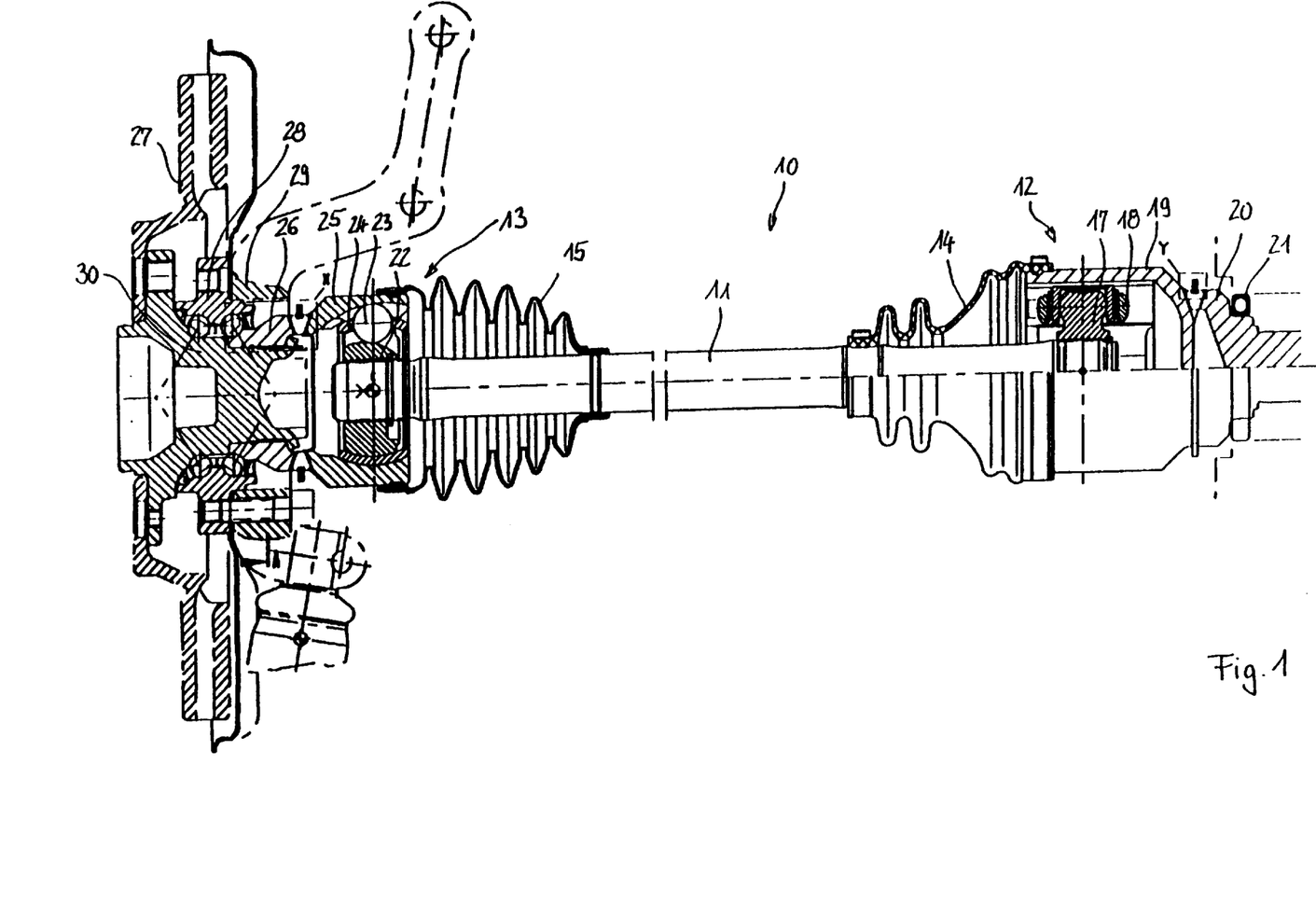
FIG. 1 shows a driveshaft between the differential drive flange and the wheel hub with two inventive connecting assemblies in a longitudinal section.

FIG. 1 shows a driveshaft 10 mounted in a vehicle as a side shaft at a steered wheel between a shaft flange 20 of a differential drive and a wheel hub 30. The driveshaft 10 comprises a tripode joint 12 at the differential drive end and a constant velocity fixed ball joint 13, which joints are connected to one another via the shaft 11. A convoluted boot 14 seals the tripode joint 12 relative to the shaft 11 and a convoluted boot 15 seals the constant velocity fixed ball joint relative to the shaft 11. The tripode joint 12 substantially comprises an inner joint part 17, roller elements 18 and an outer joint part 19, with only the outer joint part 19 being of further significance in connection with an inventive connecting assembly which has been given the reference number Y. The connecting assembly provides the connection between the outer joint part 19 and the shaft journal 20 of the differential drive, which shaft journal 20 is supported in a roller bearing 21 in the differential drive of which only the contour is shown in dashed lines. The constant velocity fixed joint 13 substantially consists of an inner joint part 22, torque transmitting balls 23, a ball cage 24 and an outer joint part 25, with only the latter being of significance in connection with the inventive connecting assembly which has been given the reference number X. The outer joint part 25 is connected via the connecting assembly directly to an annular member 26 which is positively and form-fittingly secured to the wheel hub 30 and can be regarded as part thereof. A brake disc 27 is bolted to the wheel hub 30 which, by means of a double-row ball bearing 28, is supported in a wheel carrier 29.

Figure 2:
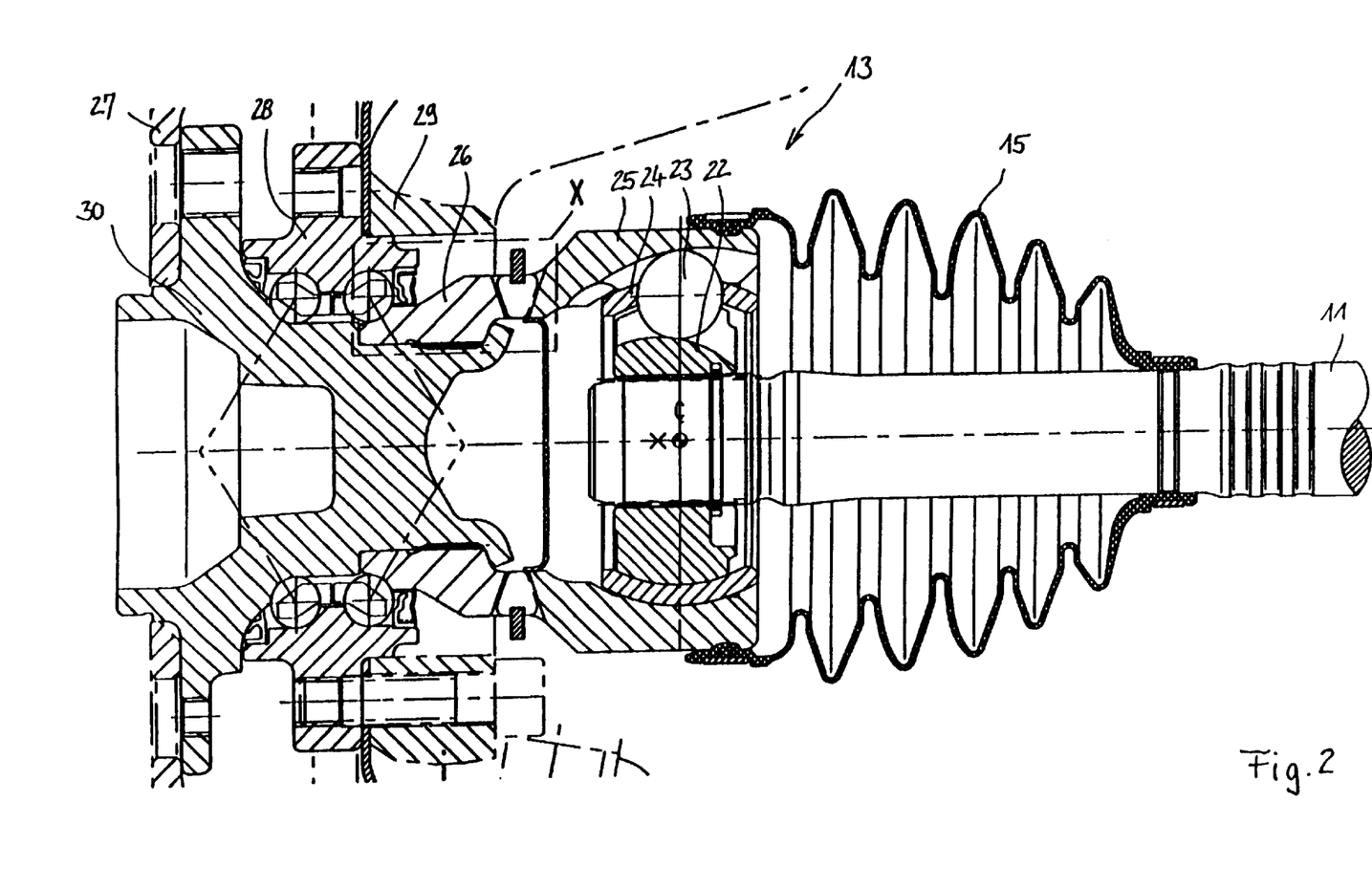
FIG. 2 shows the inventive connecting assembly between an outer joint part of a constant velocity joint of a driveshaft, which outer joint part is at the wheel hub end, and a wheel hub according to FIG. 1 in a longitudinal section.
Figure 3:
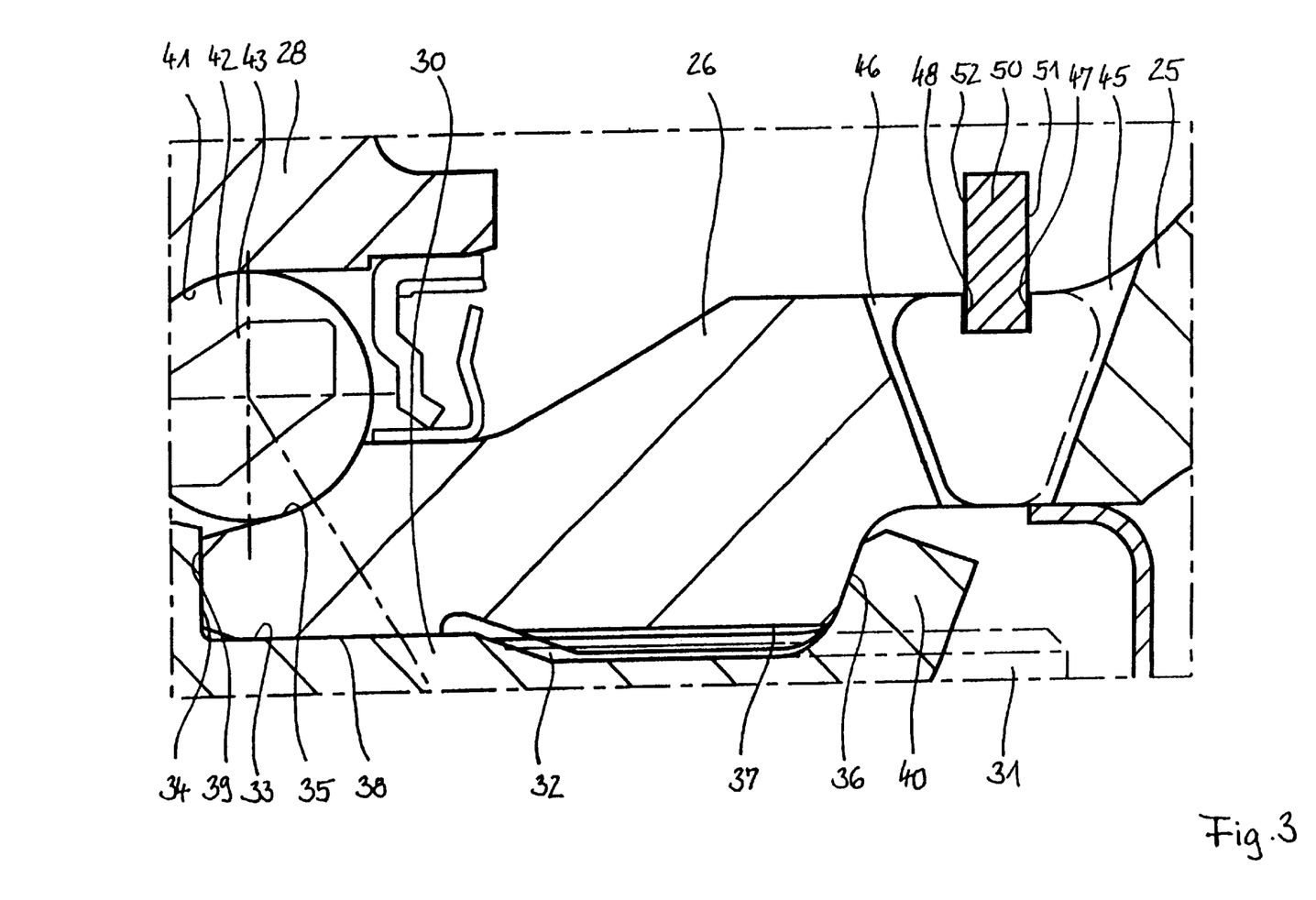
FIG. 3 illustrates a detail X of FIG. 2 in an enlarged scale.

FIGS. 2 and 3 will be described jointly below.

FIG. 2 shows the constant velocity fixed joint 13 and the wheel hub 30 of FIG. 1 in an enlarged scale. FIG. 3 is an enlarged illustration of the detail given the reference number X in FIGS. 1 and 2. As indicated especially in FIG. 3 by dashed lines, the wheel hub 30, prior to the mounting of the bearing, is provided with a sleeve-shaped projection 31 on to which there is formed a set of outer toothing 32 behind which there is provided a cylindrical centring face 33 which is delimited by a radial stop face 34. On its inner face, the annular member 26 forming a bearing groove 35 is provided with a supporting face 36, inner toothing 37 engaging the outer toothing 32, a seat face 38 positioned on the centring face 33, as well as an end face 39 which rests against the stop face 34. After the annular member 26 has been slid on to the hub 30, the projection 31 is widened so that it rests in the form of a collar 40 against the supporting face 36.

In this way, the ball bearing 28 is simultaneously completed and set, with an outer bearing groove 41 and a bearing ball 42 as well as a bearing cage 43 being visible. It can also be seen that the outer joint part 25 and the annular member 26 are provided with interengaging end toothings 45, 46 whose toothed regions open out-wardly with reference to a radial plane positioned normally on the longitudinal axis. The toothings 45, 46 axially follow the annularly ending outer joint part 25 and the annular member 26.

On the outer circumference of the end toothings 45, 46 there are provided circumferential grooves 47, 48 which, as will be described later, complement one another to form a substantially closed annular groove which is engaged by a securing ring 50. The side flanks 51, 52 of the securing ring 50 extend parallel relative to one another and are positioned in normal planes with reference to the longitudinal axis of the parts to be connected. The flanks of the circumferential grooves 47, 48, which flanks are not described in greater detail, are aligned accordingly; they thus form rectangular grooves. To the extent that the toothings 45, 46 are designed in such a way that they are axially displaceable relative to one another when the tooth flanks contact one another in a play-free way in the circumferential direction, the securing ring 50 has to engage the two circumferential grooves 47, 48 in a substantially play-free way, i.e. only an assembly play of approx. ¹⁄₁₀ mm is permissible. As regards such a tooth shape, reference is made to FIGS. 11 and 12.

Figure 4:
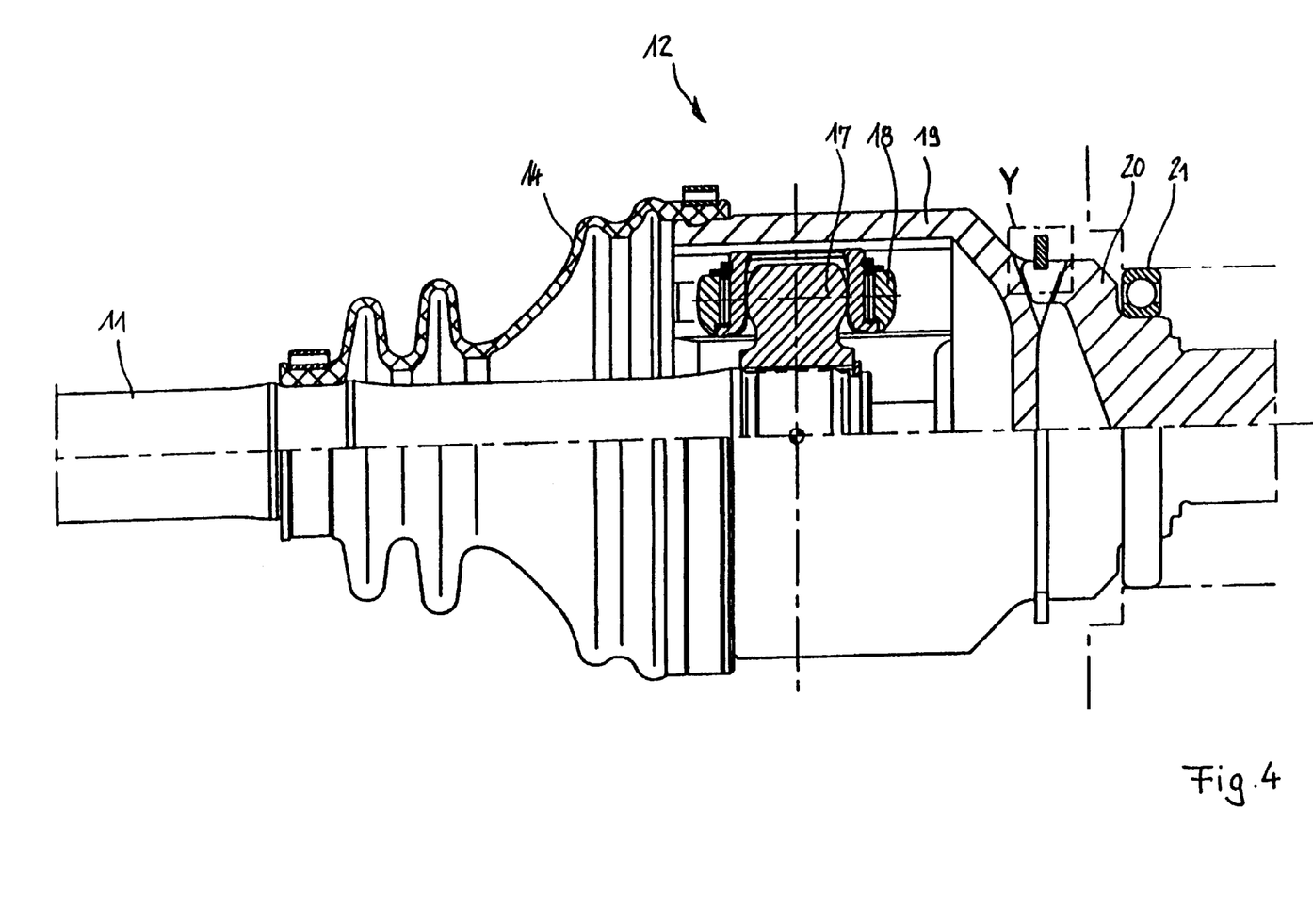
FIG. 4 shows the inventive connecting assembly between an outer joint part of a constant velocity joint of a driveshaft, which outer joint part is at the differential drive end, and a shaft journal of a differential drive according to FIG. 1 in a longitudinal section.
Figure 5:
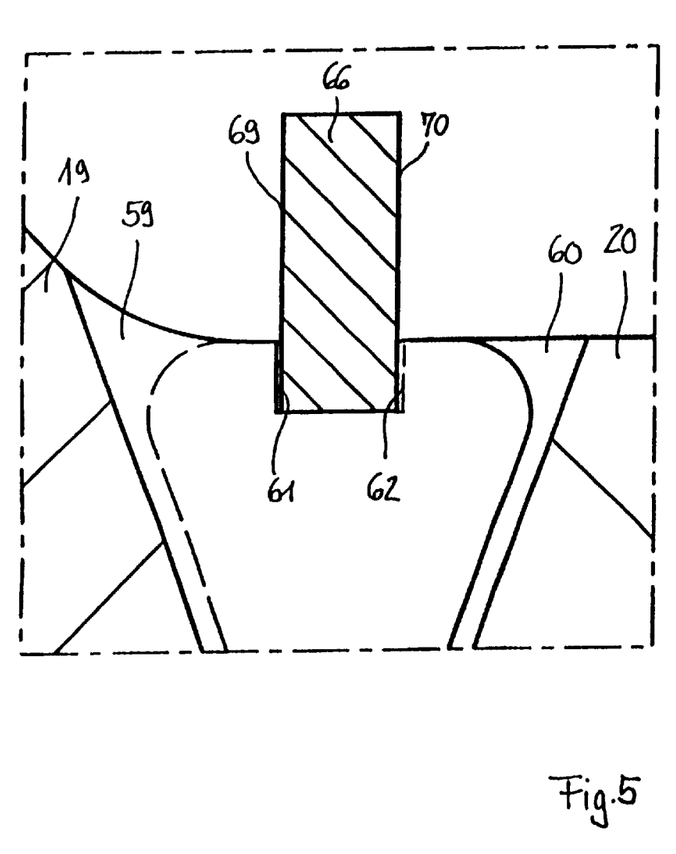
FIG. 5 shows the detail Y of the connecting assembly according to FIG. 4 in a modified embodiment.
Figure 6:
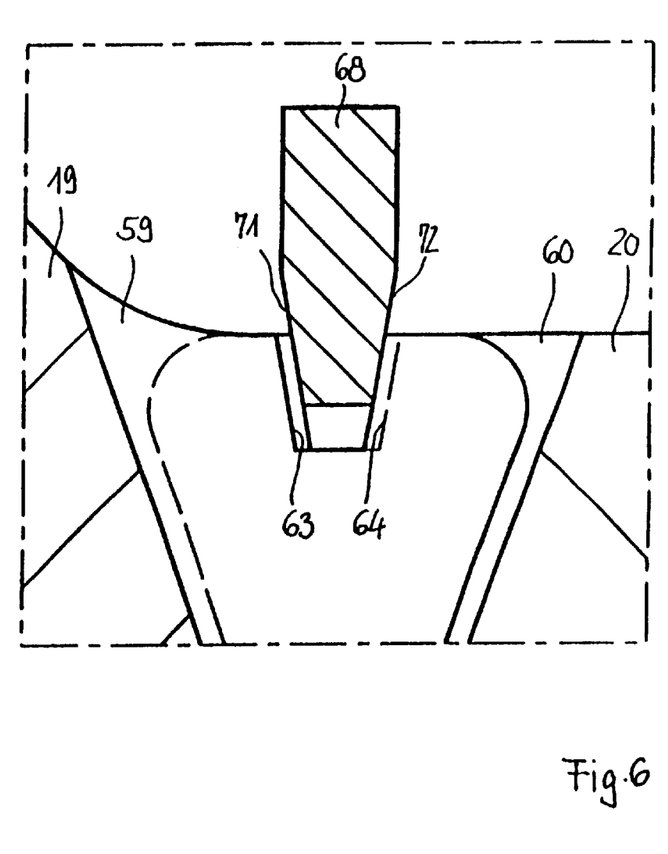
FIG. 6 illustrates a detail of the connecting assembly according to FIG. 4 in a modified embodiment compared to FIG. 5.

FIGS. 4 to 6 will be described jointly below.

FIG. 4 shows the tripode joint 12 and the shaft flange 20 of FIG. 1 in an enlarged scale. FIG. 5 shows the detail designated as Y in FIGS. 1 and 4 in an enlarged scale, with FIG. 6 showing a modification of said detail.

The outer joint part 19 is provided with end toothing 59 and the shaft journal 20 with end toothing 60. On the outside of the end toothings, there are provided the circumferential grooves 61, 62 (FIG. 5) which have the same width, but are axially offset relative to one another. The circumferential grooves are engaged by a securing ring 66 (FIG. 5), 68 (FIG. 6). The securing ring 66 comprises flanks 69,70 which extend parallel relative to one another. In the region where it engages the circumferential grooves 63, 64, the securing ring 68 comprises outwardly opening flanks 71, 72 which form an angle with one another. In respect of their alignment, the flanks of the circumferential grooves 61, 62, 63, 64 correspond to the flanks of the securing ring 66, 68. The circumferential grooves 61, 62, 63, 64 are axially offset relative to one another by a small amount and thus form a to-and-for-jumping annular groove. In the case of connecting assemblies of the type shown here with axially offset circumferential grooves, it has to be assumed that the toothings 59, 60, while contacting one another in a play-free way in the circumferential direction, at the same time support one another axially under pressure. A securing ring 66, 68 inserted in this position of the toothings, then rests under compressing pretension in a clearance-free way by means of its flank 70, 72 against the righthand flank of the circumferential groove 61, 63 of the end toothing 59 and, by means of its flank 69, 71, only against the lefthand flank of the circumferential groove 62, 64 of the end toothing 60. Relative to the respective other flank of the circumferential groove, it is permitted to provide an amount of play which is greater than the assembly play. Especially the rectangular ring according to FIG. 5 should be fitted while the end toothings are held under compressing pretension. On the other hand, the wedge-ring according to FIG. 6 can be inserted without such compressing pretension between the end toothings, but with the securing ring 68 itself being under a radial pretension. A radial contracting of the ring into the circumferential groove then generates the respective compressing pretension in the axial direction between the end toothings.

Figures 7, 8:
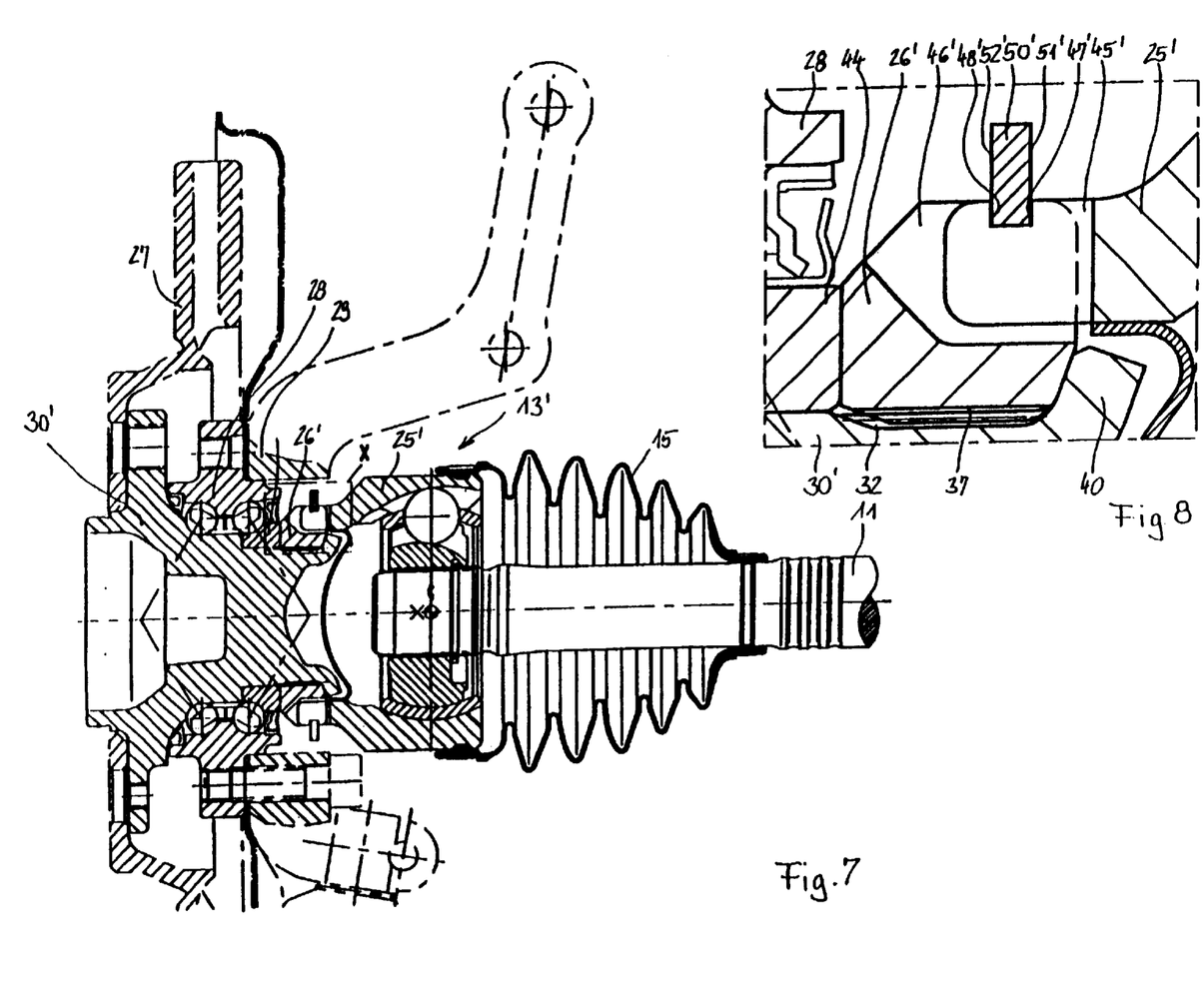
FIG. 7 shows an inventive connecting assembly between an outer joint part of a constant velocity joint of a driveshaft, which outer joint part is at the wheel hub end, and a wheel hub in a longitudinal section in a modified embodiment compared to FIG. 2.
FIG. 8 shows the detail X according to FIG. 7 in an enlarged scale.

FIGS. 7 and 8 will be described jointly below.

They show an assembly with a constant velocity fixed joint 13' and a wheel hub 30' which substantially corresponds to the embodiment according to FIGS. 1 to 3. However, an annular member 26' is separate from a bearing race 44'. The wheel hub 30' is provided with outer toothing 32 which cooperates with inner toothing 37 of the annular member 26'. The annular member 26' is held by a collar 40 of the wheel hub. The end toothing 46' of the annular member 26' is not designed as an axial extension of a solid annular part, but it is substantially formed on to the outer circumference of the solid annular part, while being radially fully supported thereby without axially projecting therefrom. The end toothing 45' of the modified outer joint part 25' thus extends over the region of the solid annular part of the annular member 26'. The respective front end faces of the toothings 45', 46' are positioned in planes which extend parallel relative to one another and which are axis-normal relative to the longitudinal axis of the connecting assembly. In circumferential grooves 47', 48' provided on the outside of the end toothings 45', 46', there is arranged a securing ring 50'. The design of the circumferential grooves 47', 48' and of the securing ring 50' with end faces 51' 52', which extend parallel relative to one another, substantially corresponds to the illustration of FIG. 3, i.e. the rectangular ring engages the circumferential grooves in a substantially play-free way and, depending on the load applied, is supported on one of the two flanks of the circumferential grooves.

Figures 9, 10:
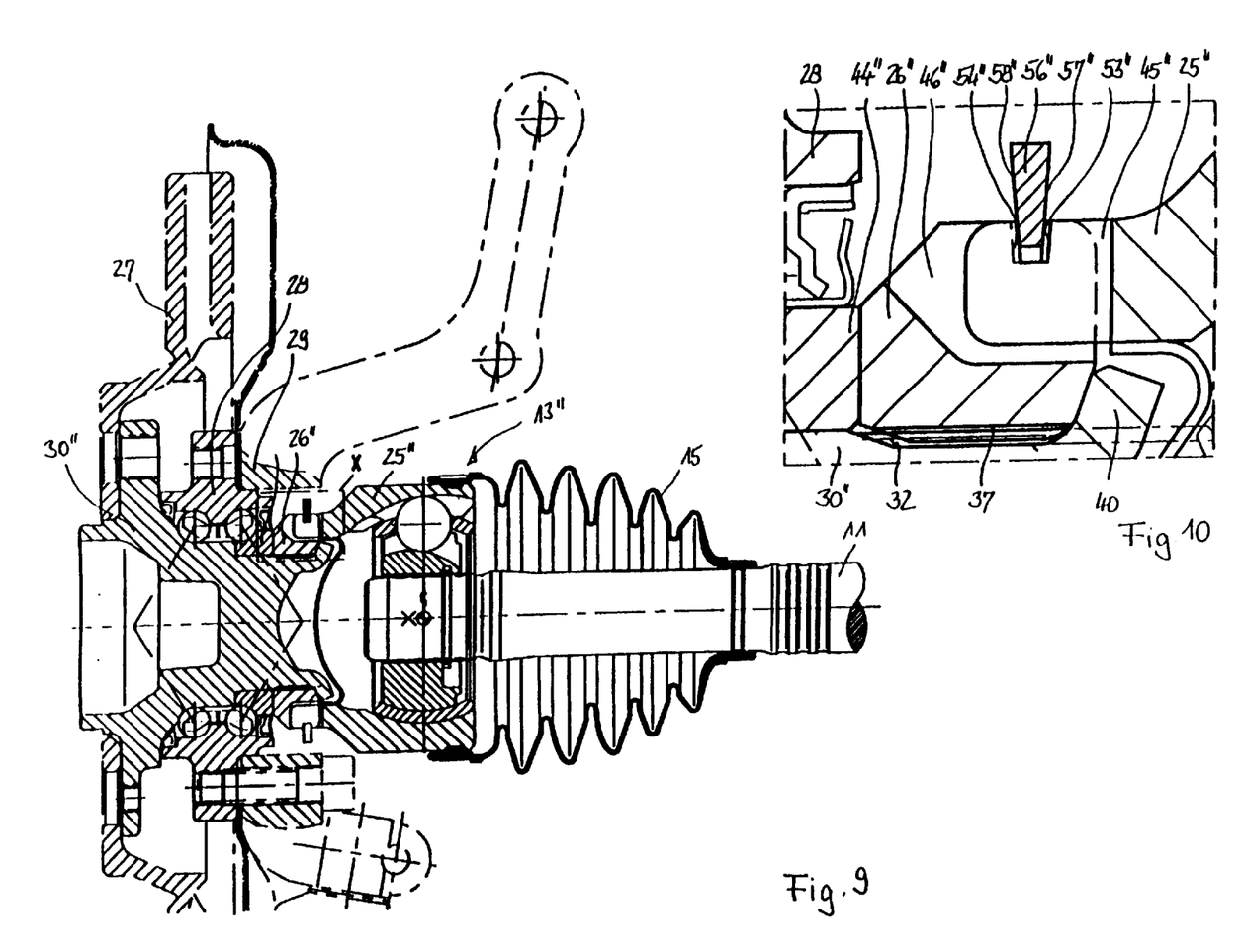
FIG. 9 shows an inventive connecting assembly between an outer joint part of a constant velocity joint of a driveshaft, which outer joint part is at the wheel hub end, and a wheel hub in a longitudinal section in a modified embodiment compared to FIG. 2.
FIG. 10 shows the detail X according to FIG. 9 in an enlarged scale.

FIGS. 9 and 10 will be described jointly below.

They show an assembly consisting of a constant velocity fixed joint 13" and a wheel hub 30", which assembly substantially corresponds to that shown in FIGS. 1 to 3. As in FIGS. 7 and 8, the end toothing 46", in this case, too, is provided at the outer circumference of the annular member 26" which is axially supported on, and rests against, a separate bearing race 44". The end toothing 46" is thus radially supported by the solid annular part of the annular member 26" and does not axially project therefrom. The outer joint part 25" is provided with end toothing 45" which extends over the solid annular part of the annular member 26". In the circumferential grooves 53", 54" which are provided in the outside of the end toothings 45", 46", there is arranged a securing ring 56". The design of the circumferential grooves 53", 54" and of the securing ring 56" with conical end faces 57", 58" substantially corresponds to the illustration in FIG. 6. With the assembly shown here, it has to be assumed that the toothings are axially supported relative to one another under pressure; they are held together in a play-free way in the axial direction and in the circumferential direction by the securing ring 56" which, in view of the presence of radial pretension in the securing ring 56", rests in a play-free way only against one flank of the circumferential grooves 53", 54" each which are axially offset relative to one another.

Figure 11:
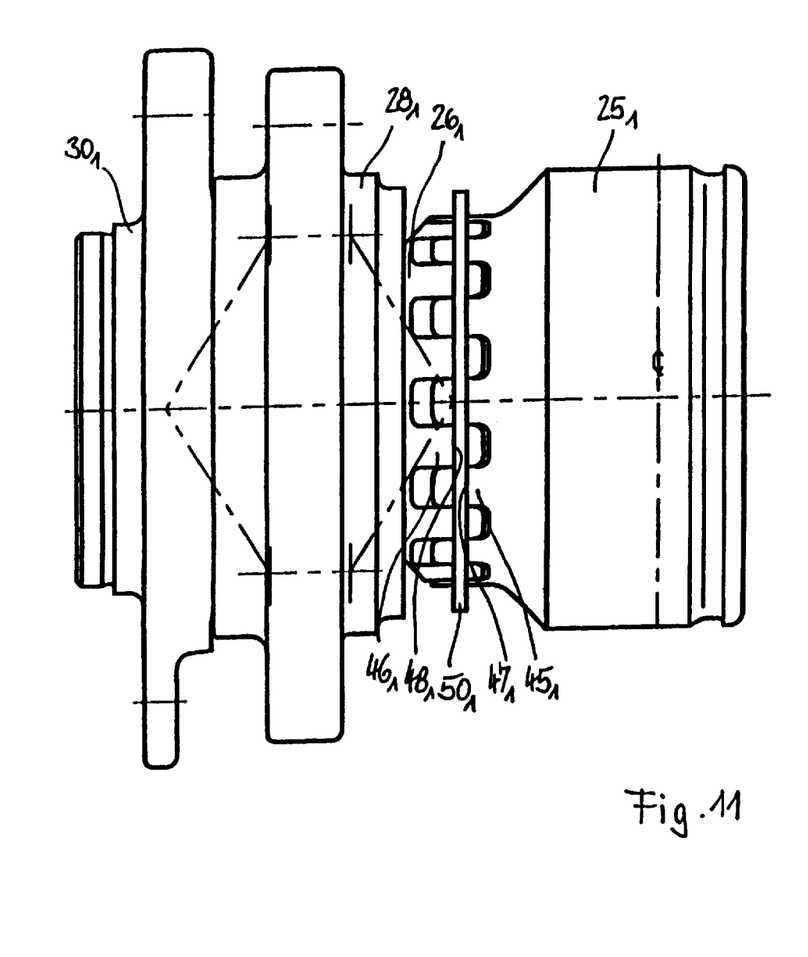
FIG. 11 is a radial view of an inventive connecting assembly with tooth flanks extending parallel relative to one another in the axial direction.
Figure 12:
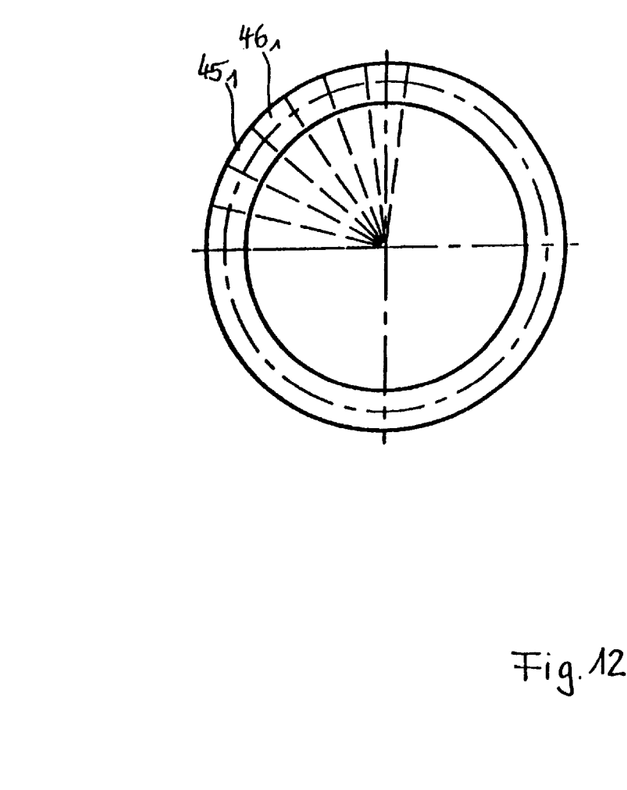
FIG. 12 is an end view of the toothing according to FIG. 11.

FIGS. 11 and 12 will be described jointly below.

They show an outer joint part $25_1$ and a wheel hub $30_1$ as well as a bearing $28_1$ in which the wheel hub $30_1$ is supported. In a radial view and in cylindrical sections, the end toothings $45_1$, $46_1$ are provided with parallel flanks, with the flanks, as indicated in FIG. 12, being provided in radial planes extending through the longitudinal axis of the connecting parts. The end faces of the end toothings $45_1$, $46_1$ are arranged at an axial distance from the other part of the connection. With the toothings circumferentially engaging one another in a play-free way, the parts to be connected, in principle, are still axially displaceable relative to one another.

In circumferential grooves $47_1$, $48_1$ which are provided on the outside of the end toothings, there is arranged a securing ring $50_1$ which aligns the circumferential grooves $47_1$, $48_1$ relative to one other and axially secures the wheel hub $30_1$ relative to the outer joint part $25_1$. It is obvious that, in this case, the securing ring has to engage the circumferential grooves $47_1$, $48_1$ in as play-free a way as possible, which grooves, in consequence, form a closed annular groove. The circumferential grooves $47_1$, $48_1$ and the securing ring $50_1$ can have parallel flanks, in which case the securing ring $50_1$ has to be inserted into the annular groove with a small assembly play of approx. $\frac{1}{10}$ mm. The circumferential grooves $47_1$, $48_1$ and the securing ring $50_1$ can also be provided with conical, out-wardly opening flanks, in which case the securing ring $50_1$ should comprise radial pretension. In this way, the securing ring $50_1$ is able to align the circumferential grooves $47_1$, $48_1$ relative to one another and, when contacting the respective two flanks of the circumferential grooves $47_1$, $48_1$, the securing ring $50_1$ can provide an axial play-free connection between the wheel hub $30_1$ and the outer joint part $25_1$.

Figure 13:
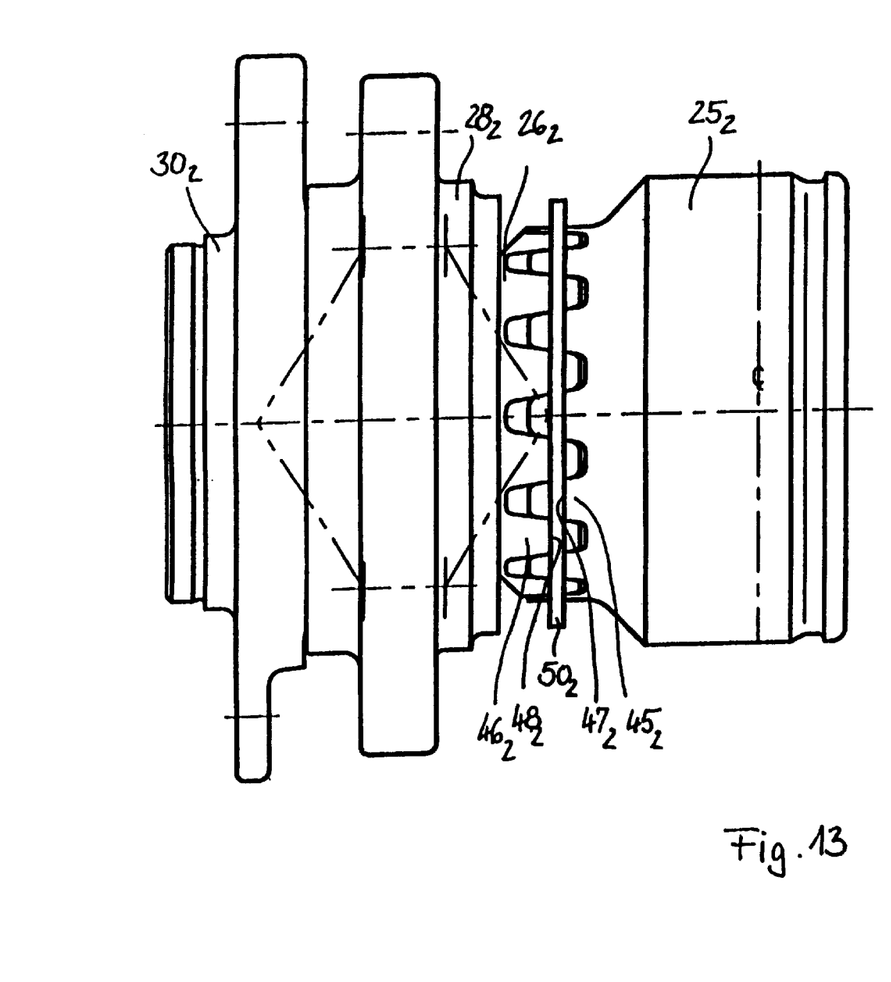
FIG. 13 is a radial view of an inventive connecting assembly with tooth flanks which enclose an angle relative to the axial direction.
Figure 14:
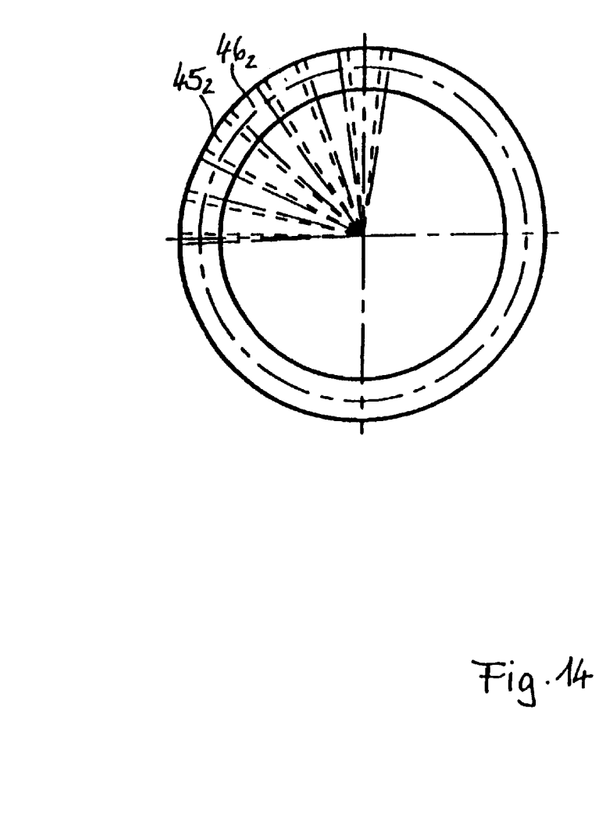
FIG. 14 is an end view of the toothing according to FIG. 13.

FIGS. 13 and 14 will be described jointly below.

They show an outer joint part $25_2$ and a wheel hub $30_2$ as well as a bearing $28_2$ which is supported in the wheel hub $30_2$. In a plan view and in cylindrical sections, the end toothings $45_2$, $46_2$ are provided with wedge-shaped flanks, with said flanks, as indicated in FIG. 14, being provided in radial planes extending through the longitudinal axis of the connecting parts. When the flanks of the end toothings rest against one another, the end faces of the end toothings $45_2$, $46_2$ are positioned at an axial distance from the other part of the connection. With the toothings engaging one another in a play-free way, the parts to be connected are axially supported relative to one another.

The circumferential grooves $47_2$, $48_2$ are engaged by a securing ring $50_2$ which axially secures the wheel hub relative to the outer joint part. The circumferential grooves $47_2$, $48_2$ can be axially offset relative to one another by a small amount, in which case the securing ring $50_2$ rests only against one flank each under compressing pretension. The circumferential grooves and the securing ring can have parallel flanks. The circumferential grooves and the securing ring can also have conical, outwardly opening flanks, in which case the securing ring should comprise radial pretension. In this way, when coming into contact with one flank of the circumferential grooves each, the securing ring can provide a play-free connection between the end toothings $47_2$, $48_2$.

What is claimed is:

1. An assembly comprising:
   a vehicle driveshaft comprising a shaft (11), a first constant velocity joint (13) and a second constant velocity joint (12) at opposing ends of the shaft (11); and
   a wheel hub (3) connected to said first constant velocity joint (13),
   said first constant velocity joint (13) comprising an outer joint part (25) having end toothing (45) formed therein, said wheel hub (30) having complementary, inter-engaging end toothing (46),
   wherein the end toothings (45, 46) are axially inserted into one another and circumferentially engage one another in a play-free way and wherein the teeth of the end toothings (45, 46) each comprise radially outwardly opening circumferential grooves (47, 48; 53, 54) which are delimited by two flanks and which, jointly, form a circumferentially extending annular groove in which, on the outside, there is arranged a securing ring (50, 56).

2. An assembly comprising:
   a vehicle driveshaft comprising a shaft (11), a first constant velocity joint (13) and a second constant velocity joint (12) at opposing ends of the shaft (11); and
   a differential drive comprising a shaft flange (20) connected to said second constant velocity joint (12),
   said second constant velocity joint (12) comprising an outer joint part (19) having end toothing (59) formed therein, said shaft flange (20) having complementary, inter-engaging end toothing (60),
   wherein the end toothings (59, 60) are axially inserted into one another and circumferentially engage one another in a play-free way and wherein the teeth of the end toothings (59, 60) each comprise radially outwardly opening circumferential grooves (61, 62; 63, 64) which are delimited by two flanks and which, jointly, form a circumferentially extending annular groove in which, on the outside, there is arranged a securing ring (66, 68).

3. A connecting assembly according to claim 1 wherein, when viewed in cylindrical sections, the teeth of the end toothings ($45_1$, $46_1$) comprise flanks which extend parallel relative to a longitudinal axis.

4. A connecting assembly according to claim 1 wherein the teeth of the end toothings ($45_2$, $46_2$) comprise flanks which are angled with the angles between the flanks of the teeth of the respective end toothings ($45_2$, $46_2$) opening in opposite directions and being of identical size.

5. A connecting assembly according to claim 3, wherein the flanks of the teeth of the end toothings ($45_1$, $46_1$) are each positioned in radial planes extending through a common longitudinal axis of the wheel hub (30) and outer joint part (25).

6. A connecting assembly according to claim 4, wherein the flanks of the teeth of the end toothings ($45_2$, $46_2$) each comprise a radial ray extending through the common longitudinal axis of the two parts.

7. A connecting assembly according to claim 1, wherein the circumferential grooves (47, 48) of the teeth of the two sets of end toothing (45, 46) and the securing ring (50) are provided with flanks (51, 52) which extend parallel relative to one another and which are positioned in axis-normal radial planes.

8. A connecting assembly according to claim 1, wherein the circumferential grooves (53, 54) of the teeth of the two sets of end toothing (45, 46) and the securing ring (56) are provided with flanks (57, 58) which, relative to an axis-normal radial plane, enclose an angle which opens radially outwardly.

9. A connecting assembly according to claim 7, wherein the securing ring (50) engages the circumferential grooves (47, 48) in a play-free way.

10. A connecting assembly according to claim 7, wherein the circumferential grooves (53) of the teeth of the one set of end toothing (45) are axially offset relative to the circumferential grooves (54) of the teeth of the other set of end toothing (46) in such a way that the flanks (57, 58) of the securing ring (56) only contact those flanks of the circumferential grooves which face the respective other set of end toothing.

11. A connecting assembly according to claim 1, wherein the teeth of one of the sets of end toothing ($46_1$) are formed out of a solid annular part ($26_1$) so as to project radially therefrom.

12. A connecting assembly according to claim 8, wherein the securing ring (50) engages the circumferential grooves (47, 48) in a play-free way.

13. A connecting assembly according to claim 8, wherein the circumferential grooves (53) of the teeth of the one set of end toothing (45) are axially offset relative to the circumferential grooves (54) of the teeth of the other set of end toothing (46) in such a way that the flanks (57, 58) of the securing ring (56) only contact those flanks of the circumferential grooves which face the respective other set of end toothing.

14. A connecting assembly according to claim 2 wherein, when viewed in cylindrical sections, the teeth of the end toothings ($45_1$, $46_1$) comprise flanks which extend parallel relative to a longitudinal axis.

15. A connecting assembly according to claim 2 wherein the teeth of the end toothings ($45_2$, $46_2$) comprise flanks which are angled with the angles between the flanks of the teeth of the respective end toothings ($45_2$, $46_2$) opening in opposite directions and being of identical size.

16. A connecting assembly according to claim 14, wherein the flanks of the teeth of the end toothings ($45_1$, $46_1$) are each positioned in radial planes extending through the common longitudinal axis of the shaft flange (20) and outer joint part (19).

17. A connecting assembly according to claim 15, wherein the flanks of the teeth of the end toothings ($45_2$, $46_2$) each comprise a radial ray extending through the common longitudinal axis of the two parts.

18. A connecting assembly according to claim 2, wherein the circumferential grooves (61, 62) of the teeth of the two sets of end toothing (59, 60) and the securing ring (66) are provided with flanks (69, 70) which extend parallel relative to one another and which are positioned in axis-normal radial planes.

19. A connecting assembly according to claim 2, wherein the circumferential grooves (63, 64) of the teeth of the two sets of end toothing (59, 60) and the securing ring (68) are provided with flanks (71, 72) which, relative to an axis-normal radial plane, enclose an angle which opens radially out-wardly.

20. A connecting assembly according to claim 18, wherein the securing ring (50) engages the circumferential grooves (47, 48) in a play-free way.

21. A connecting assembly according to claim 19, wherein the securing ring (50) engages the circumferential grooves (47, 48) in a play-free way.

22. A connecting assembly according to claim 18, wherein the circumferential grooves (61, 63) of the teeth of the one set of end toothing (59) are axially offset relative to the circumferential grooves (62, 64) of the teeth of the other set of end toothing (59) in such a way that the flanks (69, 70; 71, 72) of the securing ring (66, 68) only contact those flanks of the circumferential grooves which face the respective other set of end toothing.

23. A connecting assembly according to claim 19, wherein the circumferential grooves (61, 63) of the teeth of the one set of end toothing (59) are axially offset relative to the circumferential grooves (62, 64) of the teeth of the other set of end toothing (59) in such a way that the flanks (69, 70; 71, 72) of the securing ring (66, 68) only contact those flanks of the circumferential grooves which face the respective other set of end toothing.

24. A connecting assembly according to claim 2, wherein the teeth of the end toothings (59, 60) are formed out of a solid annular part (19, 20) so as to project axially therefrom.

25. A connecting assembly according to claim 2, wherein the teeth of one of the sets of end toothing ($46_1$) are formed out of a solid annular part ($26_1$) so as to project radially therefrom.

* * * * *